Oct. 29, 1963  W. ZEIDLER  3,108,456
HOMOKINETIC UNIVERSAL JOINT FOR LARGE ANGLES OF MISALIGNMENT
Filed March 2, 1962  4 Sheets-Sheet 1

Inventor:
Willi Zeidler
By
Watson Cole Grindle & Watson
Attys.

Oct. 29, 1963 W. ZEIDLER 3,108,456
HOMOKINETIC UNIVERSAL JOINT FOR LARGE ANGLES OF MISALIGNMENT
Filed March 2, 1962 4 Sheets-Sheet 2

Inventor:
Willi Zeidler
By
Watson, Cole, Grindle & Watson
Attys.

Oct. 29, 1963  W. ZEIDLER  3,108,456
HOMOKINETIC UNIVERSAL JOINT FOR LARGE ANGLES OF MISALIGNMENT
Filed March 2, 1962  4 Sheets-Sheet 3

Inventor:
Willi Zeidler
By
Watson Cole Grindle & Watson
Att'ys.

Inventor:
Willi Zeidler

United States Patent Office 3,108,456
Patented Oct. 29, 1963

3,108,456
HOMOKINETIC UNIVERSAL JOINT FOR LARGE
ANGLES OF MISALIGNMENT
Willi Zeidler, Dusseldorf, Germany, assignor to Firma
Rheinmetall G.m.b.H., Dusseldorf, Germany
Filed Mar. 2, 1962, Ser. No. 176,956
Claims priority, application Germany Mar. 14, 1961
8 Claims. (Cl. 64—21)

This invention relates to a homokinetic universal joint for large angles of shaft misalignment incorporating joint forks of half ring shape which are capable of sliding in the shaft end fittings and which rotate such that the planes of rotation of the forks turn about the centre of the joint.

Constant speed joints of this type are known, e.g. in the form of homokinetic shaft joints. These consist of two half rings which slide along approximately quadrantal grooves in both shaft end fittings; the two ends of the said half rings rotating about a common pivot bolt. This pivot bolt is also provided with a sliding member guiding it and engaging with the two shaft end fittings in such a manner that the pivot bolt is always constrained to move in the plane bisecting the angle formed by the two shafts; this is the manner in which the constant speed characteristic of the joint is obtained.

However, this type of joint is not very well suited for use with large angles of misalignment since during each complete rotation of the shafts the efficiency of torque transmission passes twice through a maximum and a minimum value, depending on the relative position of the forks. In the course of this variation of efficiency the numerical value of minimum efficiency depends on the angle between the centre lines of the shafts. Thus, as this angle becomes greater the difference between the efficiencies for the various angular positions of the shafts during one rotation increases continuously; as a result the running of the shafts becomes more and more unsteady and the value of the mean efficiency drops sharply. This continues until with an included angle of 90° between the shafts it is no longer possible to start them running since twice during a rotation the efficiency is zero so that the parts of the joint will only jam one another.

The problem was therefore the design of a forked universal joint with constant speed properties for which these variations of efficiency during a rotation of the shafts are reduced in extent and which still permits starting up without difficulty when the angle included between the shafts is 90°.

According to the invention this is achieved by providing both shaft end fittings of such a forked universal joint with a number of, more particularly with two, such half ring forks preferably arranged in two planes which are normal on one another; the ends of such forks are hinged together, for example by means of pivot pins, in such a manner that, in the above particular case, two pairs of forks are formed in planes which are normal on one another.

As a result of such an arrangement the graphs showing the variation of efficiency for the individual pairs of forks are displaced with respect to each other for example by 90°, i.e. such that the efficiency of one pair of forks always passes through a minimum at the same position in which the efficiency of the other pair of forks passes through a maximum. The minimum of the resulting curve of efficiency variation for one shaft revolution will then have the same value, for example, as the mean efficiency for one single forked universal joint of the conventional design, having only one pair of forks. Thus the amplitude of the variations of efficiency has been reduced by half, and the extent of the variations of the mean efficiency is reduced still more. As a consequence the shafts will run much more quietly and wear of rubbing parts will be reduced substantially. In addition it is possible without difficulty to start shafts up if they include an angle of 90° or more, the mean efficiency being comparatively satisfactory.

In order to ensure a constant speed characteristic for the universal joint, it is provided with centrally located guide elements which cause the half ring forks, which slide in the grooves in the shaft end fittings, to turn about the centre of the joint at all angles of misalignment of the shafts. For this purpose the pivot bolts of the fork pairs are provided with guide members, for example guide pegs, which face inwards and register into or engage with a common centering member. With this arrangement, the centering member is located in the centre of the parts which connect the points of the end fittings of the shafts and which guide the centering member constraining it to move in the plane bisecting the angle formed by the shafts.

The centering member and the parts guiding it can have a variety of shapes. In one embodiment of the invention this centering member takes the form of an annular disc having on its outside an open annular groove e.g. of U-section facing radially outwards which provides the guide for the pegs of the pivot bolts. The parts guiding the centering member consist of two discs having a certain distance from each other and mounted normally on, and in the centre of, a component such as a pin which connects the points of the end fittings of the shafts. The centering member is then guided in such a manner as to be capable of sliding movement between these discs in a plane which is normal to the said connecting member and which passes through the centre of the said connecting member; thus the centering member will always be constrained to move in the plane bisecting the angle included by the axes of the shafts.

According to another embodiment of the present invention the centering member consists of two annular discs mounted at a certain distance apart and connected with each other at their outer periphery by means of any desired method, for example by beading formed on those portions of their outer edges which are located between the sectors occupied by the fork pivot bolts. The parts guiding the movement of the centering member consists in that case of a disc which is again mounted on the centre of, and normal to, a component connecting the points of the end fittings of the shafts; or the said disc may for example be provided in the centre with guide pegs which project axially on both sides each extending into one shaft end fitting on either side. The centering member consisting of two discs is then mounted on this disc so as to be capable of sliding motion.

In both these embodiments of the invention, the ends of the connecting component—e.g. of a pin or a guide peg—which extend into the points of the end fittings of the shafts are supported inside a hole drilled through a sphere which is located inside a socket which is formed in the point e.g. of a fitting which is located on the end of each shaft; the said socket being of such a shape as to be capable of retaining the sphere in position.

In further development of the invention the half ring forks, which slide along grooves in the end fittings of the shafts, are provided with anti-friction supports such as balls or rollers for this movement.

Further details of the invention will now be explained with reference to the embodiments represented on the accompanying drawings in which:

FIGS. 1 and 2 show a side elevation and plan view of a universal joint having only one pair of forks in the conventional design, the shafts including an angle of 90° and the forks lying in the same plane, drawn schematically;

FIGS. 3 and 4 are a side elevation and plan view respectively showing the known universal shaft joint of FIGS. 1 and 2 after the shafts have been rotated through 90° and with forks which thereby form an angle of 90°, drawn schematically;

Figure 1:
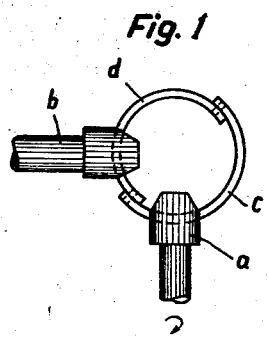

Referring to the drawing, the homokinetic universal joint shown in FIGS. 1–4 in simplified diagrams and representing a known design of the joint consists of the two shaft end fittings $a$ and $b$ and two half rings $c$ and $d$ which can slide along grooves in the two shaft end fittings, for example through a casing enclosing the two shaft end fittings. In this embodiment the ends of the half ring forks $c$ and $d$ are hinged about pivot bolts, thus forming a pair of forks. In addition there are central guide members (not shown on the drawing) which ensure that the pivot bolts are constrained always to move in a plane bisecting the angle included by the centre lines of the shafts. Thus, the forks always rotate in planes containing the forks and turning about the centre of the joint; this is the manner in which the constant speed property of the joint is obtained.

Figure 2:
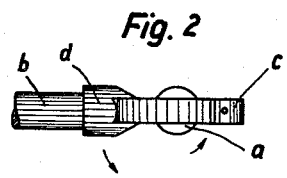

The optimum conditions for power transmission, i.e. the highest efficiency, during the various stages of one shaft revolution are obtained with this known type of joint when the forks $c$ and $d$ are co-planar and when they are aligned in the same plane. This position is shown in FIGS. 1 and 2. At this stage during the revolution of the shafts the power is transmitted e.g. by the cheeks of the end fittings of the shaft $a$ normally to the fork $c$ attached to it; this is linked to the fork $d$ which again transmits the power normally to the cheeks of the end fitting of the shaft $b$.

Figure 3:
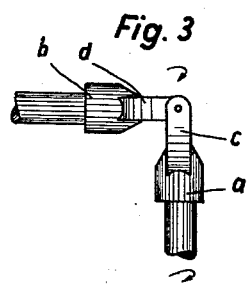
Figure 4:
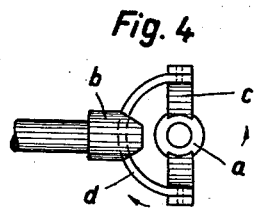

However, as the joint continues to rotate, the efficiency drops rapidly and sinks to its lowest value after an angle of rotation of 90° has been reached when the forks lie in planes which include an angle of 90°; this lowest value of efficiency is zero if the centre lines of the shafts include an angle of 90°. This stage is shown in FIGS. 3 and 4. When the end fitting of the shaft $a$ rotates, it is true that torque is transmitted normally from the cheeks of the end fitting of the shaft $a$ to the fork $c$; but in this position the fork $d$, which is linked to the fork $c$, is unable to impart rotation to the end fitting of the shaft $b$ since it cannot transmit any torque to the cheeks of the end fittings of the shaft $b$. All the forces which it can transmit, depending on its semicircular shape, are longitudinal and lateral forces which merely cause the parts of the joint to jam.

After another rotation through 90° maximum efficiency is again attained. This means therefore that during each complete revolution of the shafts the efficiency of transmission of the universal joint passes twice through a maximum and a minimum value, whose actual amounts depend on the magnitude of the angles of misalignment included by the axes of the shafts. The positions of the forks drawn in FIGS. 1 to 4 are based on an unfavourable case, in which the shafts include an angle of 90°, resulting in zero as the minimum value of the efficiency. Thus it is not possible to start the shaft motion up if the shafts occupy the position shown in FIGS. 3 and 4. Even though this relative position of the shafts may not actually occur in practice, continuous transmission of torque could hardly be maintained even if adequate fly-wheel masses were employed, since the parts of the joint would very soon become jammed.

Figure 5:
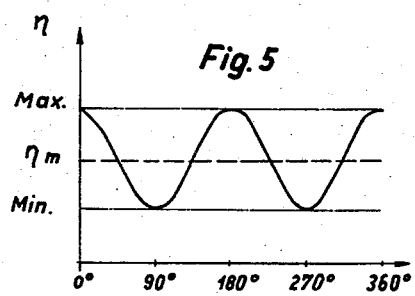
FIG. 5 is a graph showing the variation of the efficiency of power transmission between the shafts having a known type of universal joint according to FIGS. 1–4, plotted for one rotation of the shafts.

Even when the angle of misalignment of the shafts is only 45°, the running of this known type of joint becomes so unsteady, and the mean efficiency of transmission drops to such an extent, that no satisfactory transmission of power is possible. FIG. 5 shows as an example the variation of efficiency of a joint constructed in accordance with FIGS. 1–4 plotted as a graph for one complete shaft revolution for an angle of misalignment of about 40 to 50°. In that case the mean efficiency is that shown as $\eta_m$.

Figure 6:
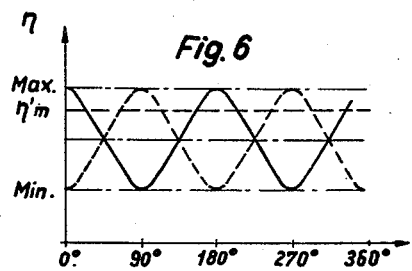
FIG. 6 is a graph showing the variation of the efficiency of power transmission between the shafts having a unibersal joint according to the invention, plotted for one rotation of the shafts.

The main feature of the present invention is the provision of two half ring forks in both shaft end fittings, the two forks in each fitting being in mutually perpendicular planes and the ends of the forks being hinged together in such a manner that two pairs of forks are formed in mutually perpendicular planes. As a result the maxima and minima of the efficiency of torque transmission for each pair of forks are displaced by 90° with respect to one another, and are superimposed on each other. This is plotted in the diagrams of FIG. 6. In that case the resulting mean efficiency $\eta'_m$ is considerably greater than the mean efficiency $\eta_m$ of the known design.

In the case of the universal joint according to the invention there is no difficulty in starting up when the angle of misalignment of the shafts is 90°. It will also be seen from the diagram that it is still possible to start up if the angle of misalignment is greater than 90° since even then, up to a certain limiting value of that angle, the efficiency is still positive for one of the two pairs of forks.

Figure 7:
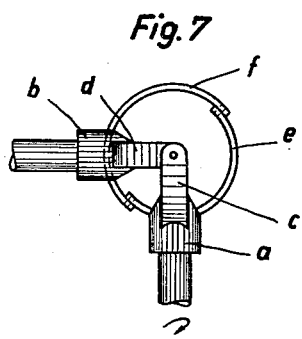
FIGS. 7 and 8 show a side elevation and plan view of the universal fork joint constructed in accordance with the invention, having two pairs of forks arranged in mutually normal planes, the shafts being at an angle of misalignment of 90°; shown schematically with the central guide members omitted.
Figure 8:
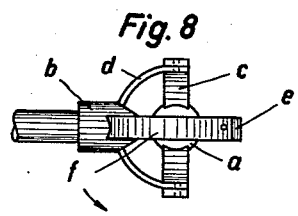
Figure 9:
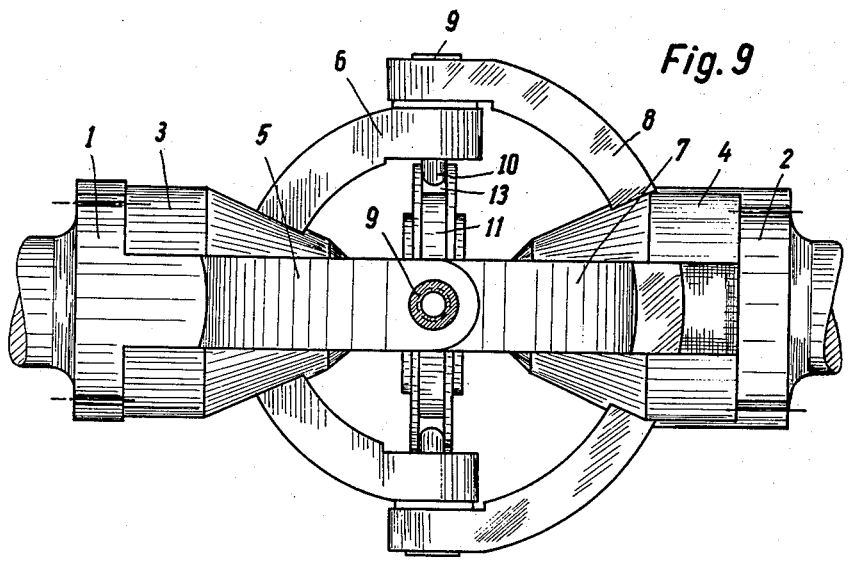
FIGS. 9 and 10 are an outside view and a longitudinal section through one embodiment of the universal fork joint according to the invention, the two shafts being shown in line.
Figure 10:
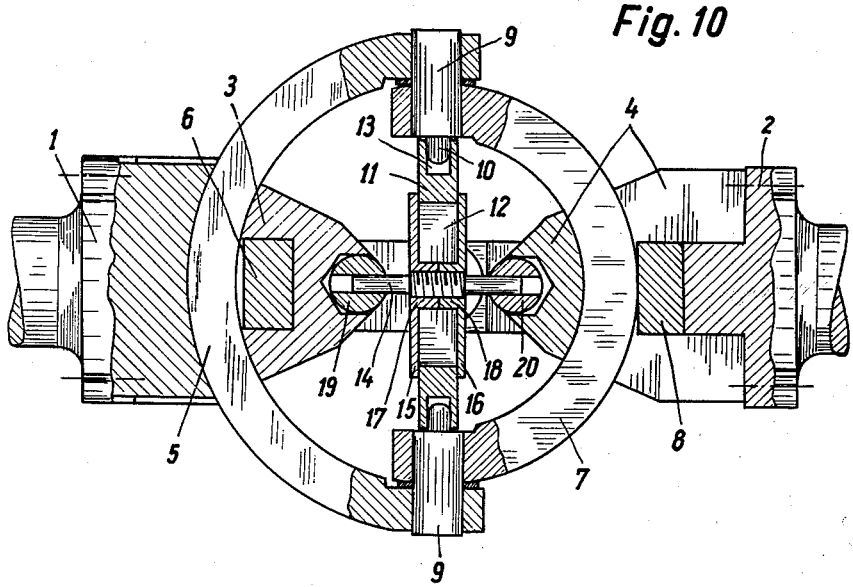
Figure 11:
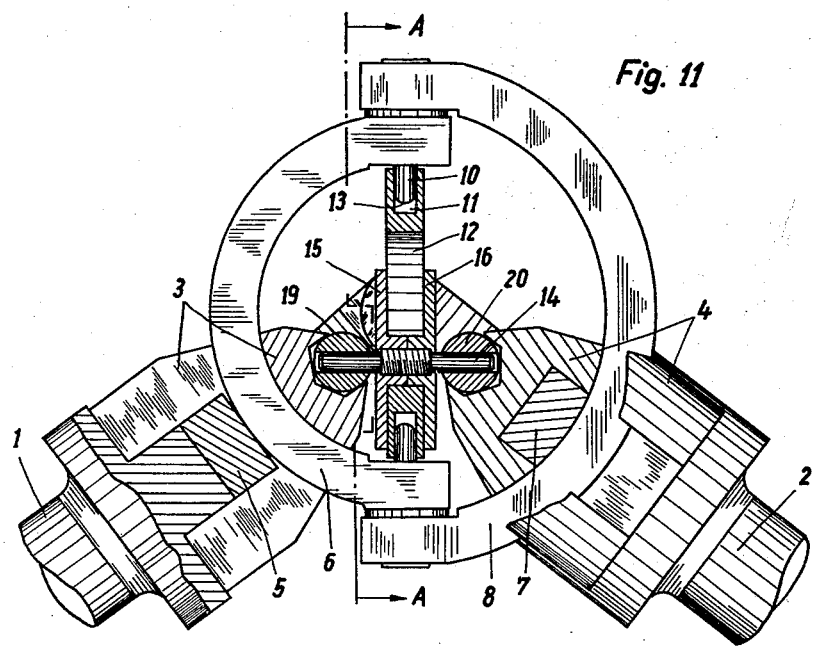
FIG. 11 is a longitudinal part-section through the universal fork joint shown on FIGS. 9 and 10, the shafts including an angle of 75°.
Figure 12:
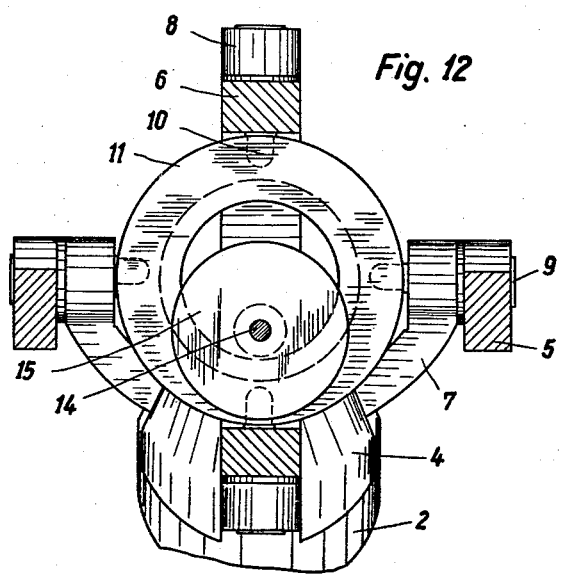
FIG. 12 is a section on the line A—A of FIG. 11.

FIGS. 7 and 8 show in simplified diagrams the universal fork joint according to the invention. In a manner similar to the embodiment shown in FIGS. 1 to 4 the joint consists again of the shaft end fittings $a$ and $b$ and the half ring forks $c$ and $d$ sliding along grooves in these fittings. Also provided inside the shaft end fittings $a$ and $b$ there are now additional forks $e$ and $f$ which are located in planes normal to those containing the forks $c$ and $d$. In this arrangement the ends of the various forks are hinged on pivot bolts such that the forks form two pairs of forks in planes which are perpendicular on one another. In addition there are here again, not shown on the drawing, central guide components which ensure that the pivot bolt is constrained to move always in the plane which bisects the angle included by the centre lines of the shafts. Thus the forks must always rotate in a plane of rotation of the forks with the centre of the joint as their fulcrum; this is the manner in which the constant speed property of the joint is obtained for all possible angles of misalignment of the joint.

The FIGS. 9 to 12 show the detail design of the mechanism for which protection is being sought. The shaft ends 1, 2 are enclosed in fittings 3, 4 to which they are attached in any manner desired, for example by screwed fastenings. The shaft ends 1, 2 and the fittings 3, 4 are so shaped that they can each accommodate, in the manner illustrated by FIGS. 9 to 12, two mutually perpendicular half ring forks 5, 6 and 7, 8 such that the latter can slide inside them. The ends of the forks are linked together by means of pivots 9 in such a manner that they form two pairs of forks 5, 7 and 6, 8 in planes which are normal on each other.

The pivots 9 are provided with guide pegs 10 facing inwards which engage with a common centering member and which are guided by the latter in such a manner that they are constrained to move in the plane which bisects the angle. In the case of the embodiment according to FIGS. 9–12 this centering member takes the form of an annular disc 11 having a central hole 12 and on its outside an open annular groove 13 of U-section facing radially outwards which provides the guide for the pegs 10 of the pivot bolt 9. In order to constrain the centering member 11 always to move in the plane bisecting the angle included by the two misaligned shafts, special guide components are provided which are mounted normally on, and in the centre of, a part connecting the points of the end fittings of the shafts, such as a pin 14. In the case of the example illustrated by the FIGS. 9–12, the components guiding the centering member consist of two discs 15, 16 with holes in their centres both of which are provided with axial annular projections 17 or 18 respectively at their inner periphery. In the case shown the diameter of the discs 15, 16 is greater than the diameter of the hole 12 in the centering member and the height of the annular projections 17, 18 is such that on assembly, after the discs 15, 16 have been attached to the connecting pin 14—by screwing them together, say—a guide disc is formed having on its outside an open annular groove of deep U-section facing radially outwards; the annular projections 17, 18, which are in contact with one another, are then located within the hole 12 of the centering member and the parts of the outer edge of the discs 15, 16 enclose the parts on the inner edge of the centering member which surround the hole 12.

Each end of the connecting pin 14 is supported in a hole through the spheres 19 or 20 respectively. These spheres are located inside a socket, capable of turning in all directions, in the end of the fittings 3 or 4 respectively which are attached to the ends 1 or 2 respectively of the shafts. The sockets extend beyond the centres of the spheres and the diameter of their outer edge is slightly less than that of the sphere, so that the sphere 19 or 20 respectively will be retained securely in the socket.

Figure 13:
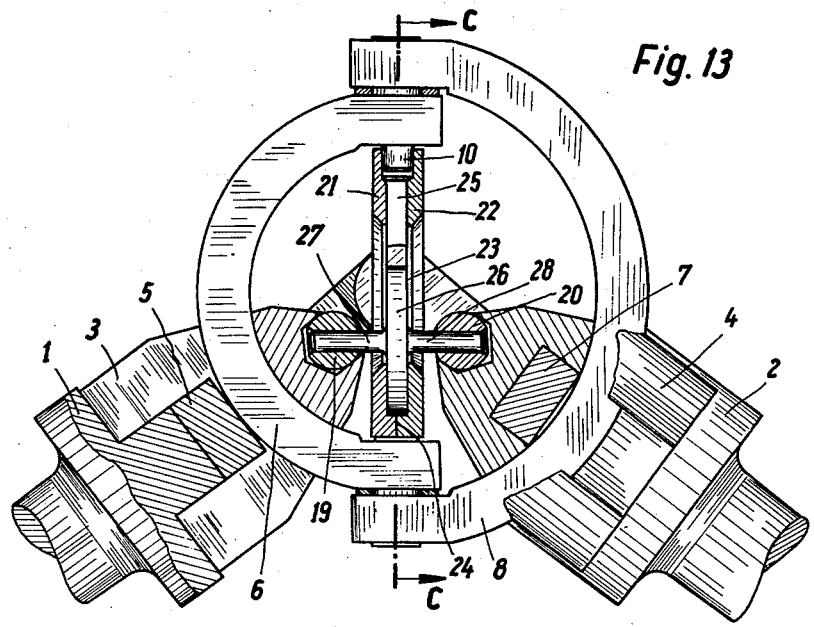
FIG. 13 is a longitudinal part-section on the line B—B of FIG. 14 through another embodiment of the universal fork joint according to the invention, the shafts including an angle of 75°.
Figure 14:
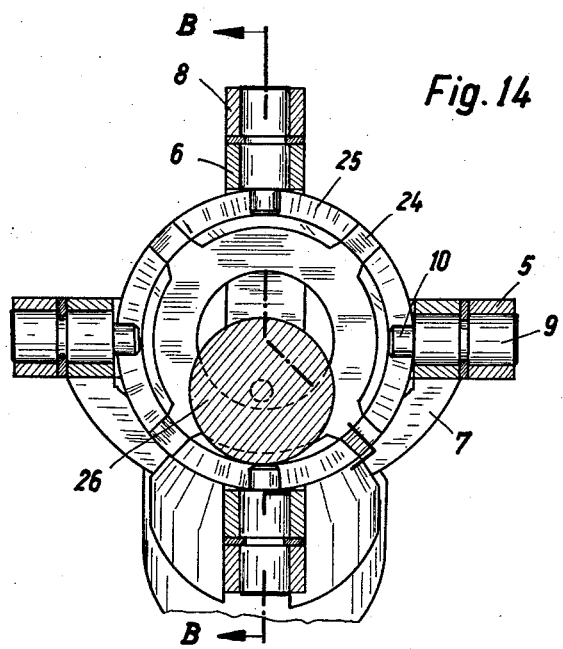
FIG. 14 is a section on the line C—C of FIG. 13.

FIGS. 13 and 14 show another universal fork joint in accordance with the invention having a different design of the centering member which ensures the constant speed characteristic of the joint. In this embodiment the pegs 10 of the pivot bolts 9 engage with a centering member consisting of two annular discs 21, 22 having a central hole 23. The various sectors 24 of the outer edges of the discs 21, 22 are connected with one another in any desired manner, e.g. in the present case by means of radial projections, in such manner that an outer guide groove of U-section facing radially outwards for the pegs 10 of the pivot bolts 9 is formed on the neighbouring sectors 25. Since the pegs of the pivot bolts 9 are slightly moving along this guide groove during each rotation of the shafts, the connection sectors 24 of the discs 21, 22 are so arranged that they are located outside the paths traversed by the pivot bolts 9.

In this embodiment the component guiding the centering member takes the form of a disc 26 having a diameter which is greater than the diameter of the central hole 23 in the annular discs 21, 22. In this case the thickness of the disc 26 corresponds to the distance between the two annular discs 21, 22 such that the disc 26 can just be moved between the discs 21, 22. In its centre the disc 26 is provided with pegs 27, 28 projecting axially on both sides which resemble the connecting pin 14 of the embodiment constructed in accordance with the FIGS. 9–12, and whose ends extend on either side into the points of the fittings of the shaft ends, supported in the holes in the spheres 19 or 20 respectively.

On assembly of this embodiment of the universal fork joint the annular discs 21, 22 are only joined together after the disc 26 has been inserted between them. Thus, the sectors of the inner edge of the connected annular discs 21, 22, which surround the hole 23, enclose the outer edge sectors of the disc 26. In this manner the centering member consisting of the discs 21, 22 will always be constrained to move in the plane of the disc 26 which is always normal to the line joining the points of the shaft end fittings, i.e. in a plane which always coincides with the plane bisecting the angle included by the centre lines of the misaligned shafts. However, within this plane it can be moved to the extent to which it is possible to move the disc 26 inside the hole 23 in the discs 21, 22.

The invention is not limited in scope by the embodiments herein represented. Thus it is in the first place of advantage if the forks 5, 6, 7, 8 are supported inside the shaft end fittings 1, 2 by means of ball, roller or needle bearings in order to reduce wear of the components of the joint as far as possible. Furthermore, the centering members can also take the form of any other type of mechanism of suitable shape incorporated in the joint. It is also quite possible to provide more than two half ring forks which can slide in grooves in each shaft end fitting, in order to obtain a still better overall efficiency variation by a better superposition of the efficiency graphs applicable to the individual forks. In addition the forks may within the framework of the invention designed to have a shape different from that shown here, for reasons concerned for example with ease of manufacture; this will not affect the main characteristic of the invention, namely the provision of a number of forks which can slide in grooves inside the shaft end fittings and which rotate in their planes about the centre of the joint.

What I claim is:

1. A homokinetic universal joint for large angles of a pair of shaft misalignment or movement comprising a fitting on the end of each shaft and each fitting having a pair of perforations therein, a half ring fork provided in each perforation with the two half ring forks for each fitting being provided at right angles to each other, a piovt bolt for each end pair of opposite pairs of ring forks so that the pairs of interconnected ring forks may pivot relative to each other, each pivot bolt having an inwardly directed guide peg, and an annular disc with an outer annular groove therein in which the guide pegs project, said annular disc forming a common centering member so that the pegs will be guided in the annular groove during the relative angular movement of the shafts.

2. A homokinetic universal joint according to claim 1, in which the outer radius of one of the pair of forks in a fitting is substantially equal to the inner radius of the other fork of said last-mentioned pair of forks.

3. A homokinetic universal joint according to claim 1, in which each fitting on the end of each shaft is cone shaped with the apex of the cone directed inwards into the joint.

4. A homokinetic universal joint according to claim 1, in which a pair of discs are provided spaced from each other and overlapping the sides of the annular disc and having means to connect the inner ends of the fittings of the shafts.

5. A homokinetic universal joint according to claim 1, in which a sphere is mounted on the inner end of each fitting and having a central hole therein, and in which a pair of discs and a pin are provided with the pair of discs mounted on the pin with the last-mentioned discs being slidable on the outer sides of the annular disc, the pin projecting into the holes in the spheres.

6. A homokinetic universal joint as claimed in claim 1, in which a movable disc is provided, mounted in the annular disc, and in which means are provided to mount the said movable disc in the annular disc and supported by the fittings.

7. A homokinetic universal joint as claimed in claim 1, in which the centering member is located normal to, and in the centre of, the parts which connect the points of the end fittings of the shafts and which guide the centering member constraining it to move in the plane bisecting the angle included by the shafts.

8. A homokinetic universal joint as claimed in claim 1, in which the annular disc having on its outside the open annular groove which is of U-section facing radially outwards which provides the guide for the pegs of the pivot bolts.

References Cited in the file of this patent

UNITED STATES PATENTS

| | | |
|---|---|---|
| 1,058,878 | Lowndes | Apr. 15, 1913 |
| 1,389,297 | Dusseau | Aug. 30, 1921 |
| 1,965,853 | Morrison | July 10, 1934 |
| 2,614,404 | Devos | Oct. 21, 1952 |
| 2,627,734 | Villard | Feb. 10, 1953 |

FOREIGN PATENTS

| | | |
|---|---|---|
| 789,516 | France | Aug. 19, 1935 |